US006711486B1

United States Patent
(12) United States Patent
Karlsson et al.

(10) Patent No.: US 6,711,486 B1
(45) Date of Patent: Mar. 23, 2004

(54) DRIVE UNIT FOR A MOTOR VEHICLE AND METHOD OF IDENTIFYING THE ENGAGEMENT POSITION OF AN AUTOMATIC CLUTCH BEING PART OF THE DRIVE UNIT

(75) Inventors: Lars Gunnar Karlsson, Göteborg (SE); Jan Erik Lauri, Mölndal (SE); Karl Marcus Steén, Angered (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 10/069,566

(22) PCT Filed: Aug. 30, 2000

(86) PCT No.: PCT/SE00/01665

§ 371 (c)(1), (2), (4) Date: Jun. 25, 2002

(87) PCT Pub. No.: WO01/17815

PCT Pub. Date: Mar. 15, 2001

(30) Foreign Application Priority Data

Sep. 3, 1999 (SE) ............................................. 9903117

(51) Int. Cl.[7] .................................................. C06F 7/00

(52) U.S. Cl. ........................ 701/67; 74/731.1; 477/166; 477/34

(58) Field of Search .............................. 701/67, 51, 53, 701/66; 74/731.1, 732.1, 733.1; 192/3.51; 477/34, 39, 166, 169, 180

(56) References Cited

U.S. PATENT DOCUMENTS 5,624,350 A 4/1997 Bates
5,737,979 A 4/1998 McKenzie et al.
5,842,375 A 12/1998 Reeves et al.

FOREIGN PATENT DOCUMENTS

WO WO 98/46907 10/1998

*Primary Examiner*—William A. Cuchlinski, Jr.
*Assistant Examiner*—Olga Hernandez
(74) *Attorney, Agent, or Firm*—Young & Thompson

(57) ABSTRACT

Drive unit for motor vehicles, comprising an engine and an automated friction clutch arranged between the engine and its gearbox, the engagement and disengagement of the clutch being controlled by a servo unit, which is controlled by a control computer to which, from various sensors there are fed values of engine speed, rotational speed of the input shaft of the gearbox, the position of the servo unit and the position of the gearsift lever. Points on a torque curve are stored in the memory of the control computer, the curve showing the torque as a function of the servo position (the clutch position). The computer is furthermore programmed to calibrate the servo unit to a pulling position, which provides a predetermined desired value of the torque, and to check, with a certain regularity, the actual value of the torque in the pulling position and, if needed, the adjust the actual value towards the desired value by changing the position of the servo unit.

7 Claims, 1 Drawing Sheet

DRIVE UNIT FOR A MOTOR VEHICLE AND METHOD OF IDENTIFYING THE ENGAGEMENT POSITION OF AN AUTOMATIC CLUTCH BEING PART OF THE DRIVE UNIT

BACKGROUND OF THE INVENTION

The present invention relates to a drive unit for a motor vehicle, comprising a driving motor with an output shaft, a gearbox with an input shaft, a friction clutch with a first friction element joined to the output shaft, and a second friction element joined to the input shaft, a clutch actuator for engagement and disengagement of the clutch, and an electronic control unit for controlling the actuator dependent on signals fed into the control unit from a sensor, which senses the rotational speed of the output shaft, a sensor which senses the rotational speed of the input shaft, a sensor which senses the position of the clutch actuator, and a sensor which senses the position of a gear selector for shifting between the various gear speeds of the gearbox.

The invention also relates to a method of determining torque transmitted from a motor to the input shaft of a vehicle gearbox via a friction clutch, as a function of the position of a clutch actuator which is controlled by an electronic control unit, to which data is fed on motor rotational speed, the rotational speed of the input shaft and the position of the actuator.

DESCRIPTION OF THE RELATED ART

In vehicles with a known type of automated friction clutches, the clutch actuator, usually a pressure medium-actuated piston-cylinder device, is activated for engagement and disengagement of the clutch, when the gear selector is moved from its neutral position to a gear-selected position or from a gear-selected position to the neutral position. For engagement, the control unit controls the clutch actuator to set the clutch at a predetermined initial position in which a desired initial torque is transmitted from the engine to the gearbox when the engine is operating at idle speed. This initial position is called the initial engagement position and constitutes a reference point for controlling the movements of the automated clutch. The accelerator pedal of the vehicle in this case works as a "reversed" clutch pedal. As the throttle is opened from idle, the clutch engagement gradually increases from the initial engagement position to full engagement.

The initial engagement position is defined here as a determined position of the clutch actuator. During the operation of the vehicle, the clutch discs are worn down, so that the transmitted torque at an originally set initial engagement position of the clutch actuator is changed. It is known in this respect to arrange in the vehicle a control by means of which the driver can manually change the initial engagement position of the clutch actuator to compensate for disc wear. Wear and the required changing of the initial engagement position of the clutch actuator to compensate for wear do not follow each other, i.a. due to a non-linear characteristic in certain types of compression springs which are often used in vehicle clutches, e.g. disc springs. Other changes which affect the transmission of torque and which can warrant a change in the initial engagement position of the clutch actuator are, for example, a change in the friction in the clutch discs and changes in temperature. The initial engagement position is thus dependent on the individual and will therefore often vary in different vehicles of the same type.

Through EP-A-0 725 225 it is known to allow a computer in the control unit to calculate the touch point in an automated friction clutch, thereby eliminating variations due to manual adjustment. Starting from the lowest rotational speed which the gearbox tachometer can sense, the clutch actuator is moved at constant speed towards the engagement position. Based on the moment of inertia of the rotating masses, a linear relationship between the torque transmitted by the torque and the position of the clutch (the clutch actuator), a clutch touch point is calculated, which serves as an initial position. This position is stored in the computer memory.

This method requires an actuator or a clutch servo unit, which can be regulated at constant speed during the measuring process, and an electric step motor is suggested as an example. Commonly occurring pneumatic clutch servo units are not suitable in this context. Furthermore, a linear relationship is presupposed between the torque transmitted by the clutch and the position of the clutch or its operating means. The linearity is, however, affected by a number of different factors, such as the type of coating on the clutch discs and the type of compression springs of the clutch pressure plate. The method is thus not as accurate in clutches where one cannot assume a linear relationship between the torque and the position.

SUMMARY OF THE INVENTION

One purpose of the present invention is to achieve a drive unit of the type described by way of introduction with an automated friction clutch which, as does the above described known clutch device, eliminate the need for manual adjustment of the initial engagement position, but which, in contrast to the known clutch device, can utilize a servo unit in the form of a conventional pressure medium regulated piston-cylinder device at the same time as greater control precision can be achieved.

This is achieved according to the invention by virtue of the fact that there are stored in the control unit values of torque transmitted by the clutch as a function of the position of the actuator, and that the control unit is disposed firstly, when the gear selector is moved from its neutral position to a gear-selected position, to calibrate the actuator to a reference position which provides a predetermined desired value of the torque, and secondly, at regular intervals in the neutral position of the gearbox, to check the actual value of the torque at said reference position of the actuator and, if there is torque deviation from the desired value, to adjust the reference position, so that the actual value of the torque is moved towards the desired value.

A method of determining said torque curve is characterized according to the invention in that the clutch actuator, starting from a disengaged position in which the input shaft is completely disengaged, is set to a first engagement position in which torque is transmitted via the friction clutch to the input shaft, measuring the time from a predetermined lower rotational speed of the input shaft until the input shaft has reached a predetermined higher rotational speed, that the clutch actuator is thereafter, starting from a release position, set at least one other engagement position different from the first engagement position, measuring the time from a predetermined lower rotational speed of the input shaft until the input shaft has reached the same predetermined higher rotational speed, that the torque in said first and second engagement positions is calculated on the basis of the moment of inertia and the angular acceleration of the gearbox masses rotating in the neutral position, and that a torque curve as a function of the clutch actuator position is interpolated and/or extra-polated based on the calculated torque values.

In order to take into account a non-linear relationship between the torque and the position of the clutch actuator, the clutch actuator is set, during the first calibration of the control unit in more than two, preferably at least five different engagement positions for extracting the torque curve.

The method according to the invention permits the use of position-regulated pneumatic clutch actuators in existing pneumatic systems. These are less expensive and more rapidly adjusted than speed-regulated electroservo units, for example. A constant position of the operating means in the measuring positions is obtained by position feedback control, similar to closing a valve in the air supply line, while constant speed in a pneumatic clutch servo is more difficult to achieve. By measuring, in accordance with the invention, at various constant positions of the actuator, it is possible, in a simple manner, to achieve higher precision than when measuring during movement of the actuator.

The greatest precision in the method according to the invention can hereby be achieved if the torque loss in the gearbox is determined, by starting from a completely engaged clutch, setting the actuator to its completely disengaged position, measuring the time taken for the gearbox rotating masses to go from a predetermined maximum rotational speed to a predetermined minimum rotational speed, and calculating the torque in said first and second engagement positions as the sum of the accelerating torque and the torque loss.

BRIEF DESCRIPTION OF THE DRAWINGS

The invention will be described in more detail with reference to an example shown in the accompanying drawing, where.

DESCRIPTION OF THE PREFERRED EMBODIMENTS

Figure 1:
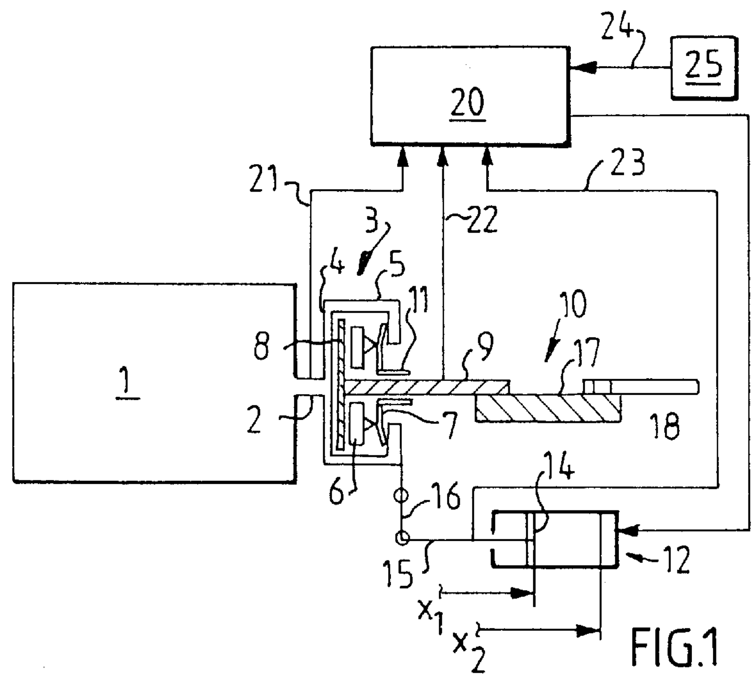
FIG. 1 shows a schematic representation of a drive unit according to the invention.

1 in FIG. 1 designates an internal combustion engine, e.g. a four-stroke diesel engine, the cam shaft 2 of which drives a clutch device 3, which includes a clutch housing 5 joined to the engine flywheel 4. The housing 5 encloses a pressure plate 6 and a compression spring 7, which, in the example shown, is a disc spring. Between the flywheel 4 and the pressure plate 6 there is a clutch disc 8, which is non-rotatably joined to the input shaft 9 of a gearbox 10. Depending on how great the torque is which the clutch is to transmit, the clutch can have more than one disc and pressure plate. The disc spring 7 is joined at its inner periphery to a release bearing 11, the movement of which to move the pressure plate from the clutch disc against the spring force is achieved with the aid of a clutch actuator 12 in the form of a pressure medium-regulated piston-cylinder device 12, the piston 14 of which has a piston rod 15 which is articulated to a lever 16 engaging the release bearing 11. The cylinder of the piston-cylinder device 12 can be joined to the existing pneumatic system of the vehicle. The input shaft of the gearbox 10 shown drives constantly via a gear (not shown in more detail here) an intermediate shaft 17, which in turn drives, via releasable gears (not shown in more detail here) the output shaft 18 of the gearbox. The hash-marked components in FIG. 1, i.e. the clutch disc 8, the input shaft 9 and the intermediate shaft 17 with gears (not shown) non-rotatably fixed thereto and the released gears (not shown) mounted on the output shaft 18 form the masses of the gearbox which rotate in the neutral position.

The piston-cylinder device 12 is controlled by a control unit 20, comprising a computer, in which signals are fed from a tachometer 21 which measures the rotational speed of the crankshaft 2, a tachometer 22 which measures the rotational speed of the input shaft 9 to the gearbox 10, a position sensor 23 which senses the position of the piston 14 of the piston-cylinder device 12, and a sensor 24 which senses the position of the gear selector 25 which can be a shift lever.

Before the vehicle is driven, the control unit 20 must be calibrated by storing in the memory of the control unit 20 points on a curve showing torque transmitted by the clutch device 3 as a function of the position of the piston 14, and a point on the curve is determined which provides a target torque, i.e. the desired initial torque, when engaging the clutch when shifting from the neutral position to a gear-selected position. This point on the curve provides a certain position of the piston 14, the initial engagement position.

Figure 2:
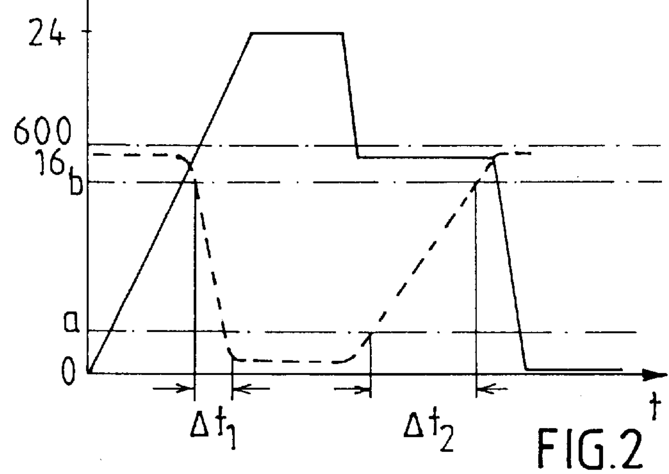
FIG. 2 shows a diagram of the position of the clutch actuator and the rotational speed of the input shaft to the gearbox as a function of time.
Figure 3:
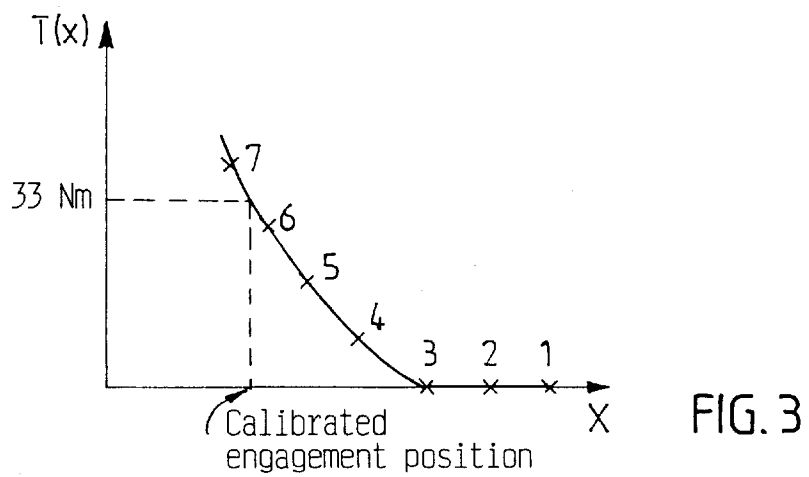
FIG. 3 shows a diagram of torque transmitted by the clutch as a function of the position of the clutch actuator.

The calibration procedure is illustrated in FIGS. 2 and 3, where the solid line curve in FIG. 2 represents the position x of the piston 14, and the dashed curve the rotational speed of the input shaft 9 as a function of the time t, while the upper dash-dot line represents the rotational speed of the crankshaft 2, which in the diagram is 600 rpm, i.e. the engine idle rotational speed. With the gear selector 25 in the neutral position and the piston 14 in its completely engaged clutch position corresponding to the position $x_2$ in FIG. 1 and 0 in FIG. 2, the piston 14 is moved to a completely disengaged position corresponding to the position $x_1$ in FIG. 1 and 24 mm in FIG. 2, and the time $\Delta t_1$, is measured from a given higher rotational speed "b" to when the input shaft 9 has reached a predetermined lower rotational speed "a". This lower rotational speed "a" can be the lowest rotational speed which is measurable by an inductive sensor 22. Thereafter, the piston is set in a first position between a completely engaged and a completely disengaged position. In FIG. 2 this is illustrated as a position 16 mm from the completely engaged position. As can be seen in the Figure, a torque is obtained here, and the time $\Delta t_2$ which it takes to accelerate the input shaft 9 up from the lower rotational speed "a" to a higher predetermined rotational speed "b", e.g. circa 575 rpm, slightly below the idle rotational speed, is measured.

Applying Newtons law $T=J\cdot\Delta\omega/\Delta t$, where T is torque transmitted by the clutch in Nm, J is the moment of inertia, and $\Delta\omega/\Delta t$ is the angular acceleration for the hash-marked masses in FIG. 1, a point on the torque curve T(x) can be computed even taking into account the gearbox torque loss $T_\mu$ according to the equations $$T_\mu=-J\cdot\Delta\omega/\Delta t_1$$

$$T(x)=J\cdot\Delta\omega/\Delta t_2+T_\mu,\text{ which gives}$$

$$T(x)=J\cdot\Delta\omega/\Delta t_2-J\cdot\Delta\omega/\Delta t_1$$

In order to be able to interpolate or extrapolate from an arbitrary engagement position, at least one additional disengagement and engagement cycle must be carried out with another engagement position of the piston 14. The diagram in FIG. 3 illustrates seven different piston positions in which the torques are computed as above. In the first three positions, no torque is obtained. In the following four positions, torque is obtained, as is illustrated by the torque points 4–7, between which the torque can be interpolated. With a chosen initial torque of 33 Nm, a calibrated initial engagement position of the piston 14 is obtained at the arrow in FIG. 3.

The computer of the control unit 20 is programmed to initiate, at regular intervals, engagement and disengagement cycles in the above manner to check the actual value of the torque and, if there is a deviation from the calibrated initial torque, to adjust the piston position so that the initial torque is maintained. In a preferred embodiment, the computer of the control unit 20 is programmed to carry out this check each time the gear selector 25 of the gearbox is in the neutral position for a certain time, e.g. circa 5 seconds, which is the time the computer normally requires to carry out checking and adjustment.

A preferred embodiment has been described above, in which consideration has been taken to the torque loss $T_{\mu}$ of the gearbox when producing the curve of the torque T(x) as a function of the position of the clutch actuator, i.e. of the piston 14 in the embodiment shown and described. By including the torque loss, maximum precision is obtained in determining the initial engagement position. Somewhat less exact precision, but still higher than what can be obtained by manual adjustment of the initial engagement position, is obtained if the torque calculations are only done taking into consideration the accelerating torque, i.e. without considering the retarding torque loss.

What is claimed is:

1. Drive unit for a motor vehicle, comprising:

a driving motor (1) with an output shaft (2), a gearbox (10) with an input shaft (9), a friction clutch (3) with a first friction element (4) joined to the output shaft, and a second friction element (8) joined to the input shaft, a clutch actuator (12) for engagement and disengagement of the clutch, an electronic control unit (20) for controlling the actuator dependent on signals fed into the control unit from a first sensor (21), which first sensor senses the rotational speed of the output shaft, a second sensor (22) which senses the rotational speed of the input shaft, a third sensor (23) which senses the position of the clutch actuator, and a fourth sensor (24) which senses the position of a gear selector (25) for shifting between the various gear speeds of the gearbox, wherein, reference values of torque transmitted by the clutch (3) as a function of the position of the actuator (12) are stored in the control unit (20), and the control unit is set firstly, when the gear selector (25) is moved from a neutral position to a gear-selected position, to calibrate the actuator to a reference position which provides a predetermined desired value of the torque, and secondly, at regular intervals in the neutral position of the gearbox (10), to check the actual value of the torque at said reference position of the actuator and, if there is torque deviation from the desired value, to adjust the reference position, so that the actual value of the torque is moved towards the desired value.

2. Drive unit according to claim 1, wherein the points stored in the control unit (20) on the torque curve represent the sum of the accelerating torque and the torque loss of the gearbox (10), as a function of the position of the clutch actuator (12).

3. Method of determining torque transmitted from a motor to the input shaft of a vehicle gearbox via a friction clutch, as a function of the position of a clutch actuator which is controlled by an electronic control unit, to which data is fed on motor rotational speed, the rotational speed of the input shaft and the position of the actuator, wherein the clutch actuator, starting from a disengaged position in which the input shaft is completely disengaged, is set to a first engagement position in which torque is transmitted via the friction clutch to the input shaft, measuring the time from a predetermined lower rotational speed of the input shaft until the input shaft has reached a predetermined higher rotational speed, that the clutch actuator is thereafter, starting from a clutch actuator release position, set at least one other engagement position different from the first engagement position, measuring the time from a predetermined lower rotational speed of the input shaft until the input shaft has reached the same predetermined higher rotational speed, that the torque in said first and second engagement positions is calculated on the basis of the moment of inertia and the angular acceleration of the gearbox masses rotating in the neutral position, and that a torque curve as a function of the clutch actuator position is interpolated and/or extrapolated based on the calculated torque values.

4. Method according to claim 3, characterized in that the actuator is set at more than two different engagement positions for plotting points on the torque curve.

5. Method according to claim 3, wherein, based on the torque curve, a desired value of the torque and with it an initial position of the actuator upon engagement is determined and the control unit is disposed, with a certain regularity, to check, when the gearbox is in its neutral position, the actual value of the torque at said reference position of the actuator and, if there is deviation in the torque from the desired value, to adjust the initial position so that the actual value of the torque is displaced towards the desired value.

6. Method according to claim 3, wherein the torque loss in the gearbox is determined, starting from a completely engaged clutch, setting the actuator to its completely disengaged position, that the time taken for the gearbox rotating masses to go from a predetermined maximum rotational speed to a predetermined minimum rotational speed is measured, and that the torque in said first and second engagement positions is calculated as the sum of the accelerating torque and the torque loss.

7. Method according to claim 3, wherein the actuator is set at more than five different engagement positions for plotting points on the torque curve.

* * * * *